United States Patent [19]

Becella

[11] 4,388,663
[45] Jun. 14, 1983

[54] CLEANING CASSETTE FOR A TAPE MACHINE

[75] Inventor: Peter Becella, Frankfurt am Main, Fed. Rep. of Germany

[73] Assignee: König-Electronic Friedrich W. König, Reichelsheim, Fed. Rep. of Germany

[21] Appl. No.: 202,058

[22] Filed: Oct. 30, 1980

[30] Foreign Application Priority Data

Nov. 10, 1979 [DE] Fed. Rep. of Germany ....... 2931744

[51] Int. Cl.³ .............................................. G11B 5/41
[52] U.S. Cl. ................................................. 360/128
[58] Field of Search ............. 15/210 R; 360/137, 128, 360/132, 134; 134/9; 162/204

[56] References Cited

U.S. PATENT DOCUMENTS

| | | | |
|---|---|---|---|
| 3,439,922 | 4/1969 | Howard | 360/137 |
| 3,647,990 | 3/1972 | Eul | 360/128 |
| 3,810,230 | 5/1974 | Orlowski | 360/128 |
| 4,158,871 | 6/1979 | Leaming | 360/137 |
| 4,324,014 | 4/1982 | Stutz | 360/137 |

*Primary Examiner*—Robert M. Kilgore
*Attorney, Agent, or Firm*—Michael J. Striker

[57] ABSTRACT

A cleaning cassette for a tape recorder is provided with a cleaning tape advanced in a cassette housing and a dirt-removing element made of cotton wadding, or felt, or synthetic resin and positioned in the housing in contact with the advancing cleaning tape. The dirt-removing element is wetted with a cleaning liquid through an opening formed in the housing. This liquid-absorbing element transfers the liquid to the cleaning tape which cleans the machine components as the cleaning tape is advanced in the housing.

7 Claims, 2 Drawing Figures

CLEANING CASSETTE FOR A TAPE MACHINE

BACKGROUND OF THE INVENTION

The invention relates to tape machines such as tape recorders, and more particularly to cleaning cassettes utilized for removing contaminants from the components of the tape machine.

It is known in the art that during the movement of tapes over an erase head, a pick-up head, a playback head and drive rollers these components are contaminated and resinified. This results in worsening of the quality of the pick-up and play-back process. It has been found that such contamination very often leads to smearing and resinifying of components which may cause tape entanglement, also known as "tape-salad".

Cleaning cassettes are known and commonly used in practice. Most known cleaning cassettes include a special cleaning tape which is so designed that dirt is removed from the components of the tape machine to be cleaned. However, cleaning of the components of the tape machine by means of these known cleaning cassettes is a rather long process and often not satisfactory.

SUMMARY OF THE INVENTION

It is an object of the present invention to provide a cleaning cassette for a tape machine which avoids by simple means the aforementioned shortcomings encountered in the prior art.

Another object of the invention is to provide an improved cleaning means for cleaning components of a tape machine, which means are simple, efficient and economical.

Still another object of the invention is to provide an improved cleaning cassette which is easy to assemble and operate.

These and other objects of the invention are attained by a cleaning cassette for a tape machine having drive rollers, comprising a housing, a cleaning tape adapted for advancement within said housing, and at least one dirt-removing element positioned in said housing in contact with said cleaning tape so as to wipe contaminants off the same as the tape advances in the housing.

The housing may be formed with at least one opening for wetting said dirt-removing element with a cleaning liquid.

The cassette may further comprise guide rollers positioned in the housing for supporting the cleaning tape in its advancement within the housing.

The cassette may include at least one guide element mounted in said housing in the vicinity of said dirt-removing element and adapted for guiding the cleaning tape over the surface of the dirt-removing element.

The dirt-removing element may be made of cotton wadding.

The dirt-removing element may be made of synthetic resin.

The dirt-removing element may be made of felt.

The cassette may further comprise a second dirt-removing element positioned in the housing, said second dirt-removing element being located opposite to said one dirt-removing element in the direction of elongation of the housing.

The housing may be formed with a second opening for wetting the second dirt-removing element with a cleaning liquid.

The cassette may further include a second guide element mounted in the housing in the vicinity of said second dirt-removing element and adapted for guiding the cleaning tape over the surface of said second dirt-removing element.

By means of the dirt-removing element the advancing cleaning tape picks up a cleaning liquid and cleans the heads of the tape machine, particularly the recording head which is cleaned in contact with the cleaning tape.

The contaminated machine components such as the recording head drive rollers and other are reliably cleaned in this process. Dirt is quickly and thoroughly removed from the machine components so that the quality of the pick-up and play-back process in tape machines reaches its original level.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
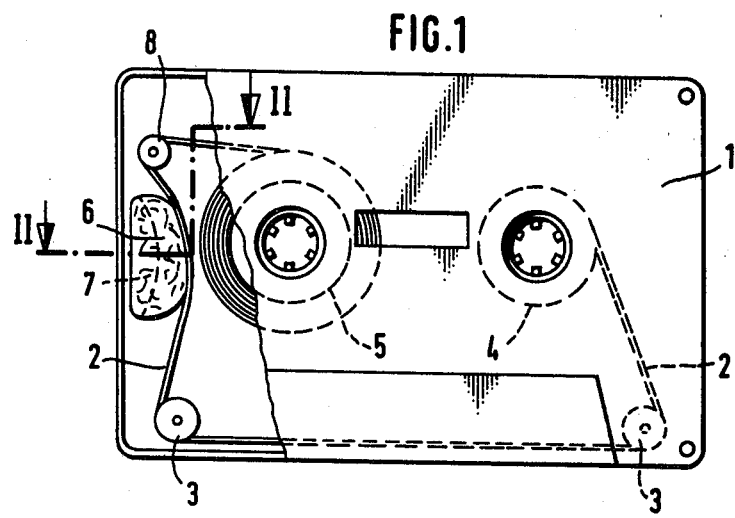
FIG. 1 is a top plan view of a cleaning cassette of the invention with a top wall partially removed.
Figure 2:
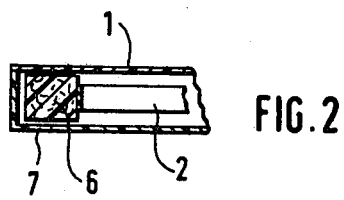
FIG. 2 is a partial sectional view taken along line II—II of FIG. 1.

Referring to the drawings and first to FIG. 1, a cleaning cassette includes a housing 1 in which a standard cleaning tape 2 is positioned. The cleaning tape is advanced over guide rollers designated as 3 and tape spools 4 and 5 located in the central part of the housing.

In the embodiment illustrated in FIG. 1, at one end of the housing 1 a dirt-removing element 6 is positioned within the interior of the housing. The dirt-removing element 6 may be made of cotton wadding, or a pad of synthetic resin material, or felt, or any other suitable material.

An opening 7 is formed in either the front or rear wall of the housing to permit one to moisten the element 6 with a cleaning liquid which is easily absorbed by the material of the element 6.

In order to ensure contact of the dirt-removing element 6 with the cleaning tape 2 when the latter is advanced over the rollers 3 and the spools 4 and 5, an additional guide element 8 is provided in the assembly. The element 8 is so located in the housing that the cleaning tape 2 rides over the entire guiding surface of the element 6 and picks up the cleaning liquid therefrom as the tape advances in the cassette. The contaminants removed by the cleaning tape from the tape heads during its advancing movement are wiped off by the dirt-removing element 6.

In another embodiment of the invention a second dirt-removing element analogous to the element 6 may be mounted in the interior of the housing at the end opposite to the location of the element 6. An additional guide element similar to the guide element 8 and positioned in the vicinity of the second dirt-removing element may be provided in such embodiment. Additionally, a second opening in one of the walls of the housing 1 may be formed for wetting the second dirt-removing element with a cleaning liquid. By such means the cleaning process may be substantially accelerated.

In order to perform the cleaning of the components of the tape machine, a cleaning cassette is installed into the machine instead of a common tape cassette, and the machine is started.

It will be understood that each of the elements described above, or two or more together, may also find a useful application in other types of a cleaning cassette for a tape machine differing from the tapes described above.

While the invention has been illustrated and described as embodied in a cleaning cassette for a tape machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cleaning cassette for cleaning components of a tape recorder, comprising a housing; a cleaning tape adapted for advancement within said housing; guide means positioned in said housing for supporting said cleaning tape in said advancement movement thereof; at least one dirt-removing element positioned in said housing in permanent contact with said cleaning tape so as to wipe contaminants off the same as the tape advances in the housing; and at least one guide element mounted in said housing in the vicinity of said dirt-removing element and adapted for guiding and cleaning tape in said permanent contact with a surface of said dirt-removing element, said housing being forward with at least one opening for wetting said dirt-removing element with a cleaning liquid.

2. The cassette of claim 1, wherein said dirt-removing element is made of cotton wadding.

3. The cassette of claim 1, wherein said dirt-removing element is made of synthetic resin.

4. The cassette of claim 1, wherein said dirt-removing element is made of felt.

5. The cassette of claim 1, further comprising a second dirt-removing element positioned in said housing, said second dirt-removing element being located opposite to said one dirt-removing element in the direction of elongation of said housing.

6. The cassette of claim 5, wherein said housing is formed with a second opening for wetting said second dirt-removing element with a cleaning liquid.

7. The cassette of claim 6, further comprising a second guide element mounted in said housing in the vicinity of said second dirt-removing element and adapted for guiding said cleaning tape over the surface of said second dirt-removing element.

* * * * *